United States Patent [19]

Valyocsik

[11] Patent Number: 4,913,795

[45] Date of Patent: * Apr. 3, 1990

[54] NOVEL CRYSTALLINE METALLOALUMINOPHOSPHATE

[75] Inventor: Ernest W. Valyocsik, Yardley, Pa.

[73] Assignee: Mobil Oil Corp., New York, N.Y.

[*] Notice: The portion of the term of this patent subsequent to Apr. 3, 2007 has been disclaimed.

[21] Appl. No.: 166,585

[22] Filed: Mar. 10, 1988

[51] Int. Cl.$^4$ .................. C01G 1/00; B01J 29/04; C01B 25/36

[52] U.S. Cl. ..................... 208/46; 423/306; 423/328; 502/208; 502/214

[58] Field of Search ............ 423/305, 306, 326, 328, 423/329, 330; 502/60, 61, 77, 208, 214; 208/46, 106, 107, 108, 109, 110, 113, 114, 118, 119, 134, 135–137, 142, 143

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 4,139,600 | 2/1979 | Rollmann | 423/329 |
| 4,296,083 | 10/1981 | Rollmann | 423/329 |
| 4,304,686 | 12/1981 | Telford | 502/61 |
| 4,310,440 | 1/1982 | Wilson et al. | 252/435 |
| 4,385,994 | 5/1983 | Wilson et al. | 210/689 |
| 4,440,871 | 4/1984 | Lok et al. | 502/214 |
| 4,444,900 | 4/1984 | Chang et al. | 502/77 |
| 4,500,651 | 2/1985 | Lok et al. | 502/208 |
| 4,567,029 | 1/1986 | Wilson et al. | 423/306 |
| 4,581,212 | 4/1986 | Araya et al. | 423/326 |
| 4,619,818 | 10/1986 | Derouane et al. | 423/306 |
| 4,623,527 | 11/1986 | Derouane et al. | 423/306 |
| 4,632,811 | 12/1986 | Derouane et al. | 423/306 |
| 4,639,357 | 1/1987 | Derouane et al. | 423/306 |
| 4,639,358 | 1/1987 | Derouane et al. | 423/306 |
| 4,647,442 | 3/1987 | Derouane et al. | 423/306 |
| 4,664,897 | 5/1987 | Derouane et al. | 423/306 |
| 4,673,559 | 6/1987 | Derouane et al. | 423/306 |
| 4,713,227 | 12/1987 | Derouane et al. | 423/305 |

OTHER PUBLICATIONS

Wilson et al., "Aluminophosphate Molecular Sieves: A New Class of Microporous Crystalline Inorganic Solids", Intrazeolite Chemistry Wash., D.C., vol. 218 (1983) pp. 79–106.

Flanigen et al., "Aluminophosphate Molecular Sieves and the Periodic Table" New Developments in Zeolite Science Technology, Kodansha Ltd., Tokyo, Japan (1986) pp. 1–10.

Lok, B. M. et al., "The Role of Organic Molecules in Molecular Sieve Synthesis", Zeolites, 1983, vol. 3, Oct., pp. 282–291.

Primary Examiner—John Doll
Assistant Examiner—R. Bruce Breneman
Attorney, Agent, or Firm—Alexander J. McKillop; Charles J. Speciale; Dennis P. Santini

[57] ABSTRACT

This invention relates to a new form of crystalline metalloaluminophosphate, to a new and useful improvement in synthesizing said crystalline material and to use of said crystalline material prepared in accordance herewith as a catalyst for organic compound, e.g. hydrocarbon compound, conversion.

15 Claims, No Drawings

NOVEL CRYSTALLINE METALLOALUMINOPHOSPHATE

CROSS-REFERENCE TO RELATED APPLICATIONS

This is related by subject matter to applications Ser. Nos. 166,586 and 166,571, filed on even date herewith.

BACKGROUND OF THE INVENTION

1. Field of the Invention

This invention relates to a new and useful synthesis of a crystalline metalloaluminophosphate from a reaction mixture containing a $C_5$–$C_7$ alkyldiamine directing agent, the new crystalline material synthesized, and to use of the crystalline material synthesized in accordance herewith as a catalyst component for organic compound, e.g. hydrocarbon compound, conversion.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehyration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

Microporous aluminum phosphates have a composition typified as:

$$xR:Al_2O_3:(1.0\pm0.2)P_2O_5:yH_2O$$

wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

$$AlPO_4 = (AlO_2^-)(PO_2^+)$$

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron" July 6, 1961 (received), pp. 1762–1776. This material, when crystalline, is identified by the Joint Commission for Powder Diffraction Standards (JCPDS), card number 15-274.

Silicoaluminophosphates of various structures are taught in U.S. Pat. No. 4,440,871. Aluminosilicates containing phosphorous, i.e. silicoaluminophosphates, of particular structures are taught in U.S. Pat. Nos. 3,355,246 (i.e. ZK-21) and 3,791,964 (i.e. ZK-22). Other teachings of silicoaluminophosphates and their synthesis include U.S. Pat. No. 4,673,559 (two-phase synthesis method); 4,623,527 (MCM-10); 4,639,358 (MCM-1); 4,647,442 (MCM-2); 4,664,897 (MCM-4); 4,639,357 (MCM-5); and 4,632,811 (MCM-3).

A method for synthesizing crystalline metalloaluminophosphates is shown in U.S. Pat. No. 4,713,227 and an antimonophosphoaluminate is taught in U.S. Pat. No. 4,619,818. U.S. Pat. No. 4,567,029 teaches metalloaluminophosphates and titaniumaluminophosphate is taught in U.S. Pat. No. 4,500,651.

The phosphorous-substituted zeolites of Canadian Patent Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

$$M_{(x-y)}:x(AlO_2^-):(SiO_2):y(PO_2^+):zH_2O$$

wherein M is a monovalent cation, x is approximately 0.125–1.5, y is 0.05–1.0 and z is the number of hydration water molecules. Structural replacement of silicon with phosphorus has been realized in material called silica clathrates (West Germany Patent No. 3,128,988).

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al (Zeolites, 1983, Vol. 3, October, 282–291) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of a C$_5$–C$_7$ diamine for synthesis of the silicoaluminophosphate of this invention.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of a novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4, 5, 6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5, having a structure different from the presently synthesized crystal, from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 \text{ or } 6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

Applicant knows of no prior art for preparing the crystalline metalloaluminophosphate of this invention utilizing as a directing agent a C$_5$–C$_7$ alkyldiamine as required of the present invention.

SUMMARY OF THE INVENTION

An improved, economical and reproducible method for preparing a crystalline metalloaluminophosphate composition exhibiting valuable properties is provided. The composition has ion-exchange properties and is readily convertible to catalytically active material. The method comprises forming a reaction mixture hydrogel containing sources of aluminum, phosphorus, non-aluminum, non-phosphorus element M, hereinafter more particularly described, directing agent, and water and having a composition, in terms of mole ratios, within the following ranges:

|  | Broad | Preferred | Most Preferred |
|---|---|---|---|
| $P_2O_5/Al_2O_3$ | 0.01 to 20 | 0.2 to 5 | 0.5 to 2 |
| $H_2O/Al_2O_3$ | 2 to 400 | 5 to 200 | 10 to 100 |
| $H^+/Al_2O_3$ | 0.01 to 30 | 0.5 to 20 | 1 to 10 |
| $R/Al_2O_3$ | 0.01 to 20 | 0.1 to 10 | 0.5 to 5 |
| $M/Al_2O_3$ | 0.01 to 20 | 0.1 to 10 | 0.5 to 5 | where R is the directing agent, hereafter more particularly described, and maintaining the mixture until crystals of the desired crystalline material are formed.

Reaction conditions required consist of heating the foregoing reaction mixture to a temperature of from about 80° C. to about 300° C. for a period of time of from about 5 hours to about 20 days. A more preferred temperature range is from about 100° C. to about 200° C. with the amount of time at a temperature in such range being from about 24 hours to about 10 days.

The reaction of the gel particles is carried out until crystals form. The solid product comprising the desired metalloaluminophosphate is recovered from the reaction medium, as by cooling the whole to room temperature, filtering and water washing.

EMBODIMENTS

The crystalline metalloaluminophosphate synthesized in accordance with the present method exhibits utility as a catalyst component for certain chemical reactions of interest, including cracking, hydrocracking, disproportionation, alkylation, isomerization and oxidation.

The particular effectiveness of the presently required directing agent, when compared with other directing agents, such as those identified above, is believed due to its ability to function as a template in the nucleation and growth of the desired metalloaluminophosphate crystals. The organic directing agent required is a $C_5$–$C_7$ alkyldiamine, such as, for example, pentanediamine, e.g. 1,5-pentanediamine and heptanediamine, e.g. 1,7-heptanediamine. This different organic directing agent functions in this fashion in a reaction mixture having the above described composition.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline metalloaluminophosphate hereby can be prepared utilizing materials which can supply the appropriate oxide. The useful sources of aluminum oxide include, as non-limiting examples, any known form of aluminum oxide or hydroxide, organic or inorganic salt or compound, alumina and aluminates. The useful sources of phosphorus oxide include, as non-limiting examples, any known form of phosphorus acids or phosphorus oxides, phosphates and phosphites, and organic derivatives of phosphorus. The useful sources of element M include, as non-limiting examples, any known form of non-aluminum, non-phosphorus element, e.g. metal, its oxide or hydroxide or salt, alkoxy or other organic compound containing M.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired metalloaluminophosphate will vary with the exact nature of the reaction mixture employed.

The metalloaluminophosphate synthesized hereby is characterized by a composition in which the number of atoms of aluminum and phosphorus is greater than the number of atoms of non-aluminum, non-phosphorus element plus any silicon, hereinafter more particularly defined and presented as "M", i.e. Al+P>M. It is named "metalloaluminophosphate" in view of its crystalline composition and of the charge distribution on its framework tetrahedral T-sites. The characteristic composition of this material, in the anhydrous state and as synthesized, is as follows:

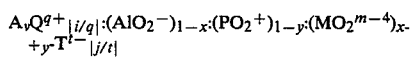

wherein v is the number of moles of A, occluded organic material resulting from organic directing agent used in synthesis of and filling microporous voids of the metalloaluminophosphate, which material may be removed upon calcination, Q is a cation of valence q, T is an anion of valence t, and M is one or more elements of valence m (weighted average) selected from the group consisting of certain non-aluminum, non-phosphorus elements and combinations thereof with $Si^{+4}$, and wherein less than about 50% of the atoms of M are $Si^{+4}$, and x, y, i and j are numbers which satisfy the relationship:

$$z = i - j, \text{ and}$$

$$z = y - x + (4 + m) \cdot (x + y)$$

wherein z is a number of from greater than $-1$ to less than $+1$. When z is greater than 0, the metalloaluminophosphate will mostly behave as a cation exchanger with potential use as an acidic catalyst. When z is less than 0, the metalloaluminophosphate will mostly behave as an anion exchanger with potential use as a basic catalyst.

The silicon/other element ratio for M will be from about 0, e.g. 0.0005, to less than about 0.5. Non-limiting examples of the composition of M include where up to about 99.95% of the atoms of M are $Ti^{+3}$, and where about 100% of the atoms of M are $Sb^{+3}$.

The composition of the metalloaluminophosphate, following removal of the organic component, for example by calcination, is the following:

$$Q^{q+}_{|i/q|}:(AlO_2^-)_{1-x}:(PO_2^+)_{1-y}:(MO_2^{m-4})_x + y \cdot T^{t-}_{|j/t|}$$

where all symbols and letters have their aforementioned meanings. The metalloaluminophosphate synthesized hereby will exhibit an ion-exchange capacity of at least about 0.002 meq/g.

The element M is characterisized by its oxidation number of from $+2$ to $+6$, and its ionic "Radius Ratio" which is in the range of 0.15 to 0.73. When the oxidation number of M is $+2$, the Radius Ratio of the element M must be from 0.52 to 0.62.

The term "Radius Ratio" is defined as the ratio of the crystal ionic radius of the element M to the crystal ionic radius of the oxygen anion, $O^{-2}$.

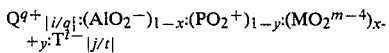

The crystal ionic radii of elements are listed in the *CRC Handbook of Chemistry and Physics*, 61st edition, CRC Press, Inc., 1980, pages F-216 and F-217, said listing incorporated herein by reference. In determining the Radius Ratio, it is necessary to use crystal ionic radii of the M atom and oxygen anion (O$^{-2}$) which have been measured by the same method.

Non-limiting examples of element M useful herein include:

| M | Valence | Radius Ratio |
|---|---|---|
| As | +3 | 0.44 |
| B | +3 | 0.17 |
| Bi | +3 | 0.73 |
| Co | +2 | 0.55 |
| Cu | +2 | 0.54 |
| Fe | +2 | 0.56 |
| Fe | +3 | 0.48 |
| Ge | +2 | 0.55 |
| Ge | +4 | 0.40 |
| In | +3 | 0.61 |
| Mn | +2 | 0.61 |
| Sb | +3 | 0.57 |
| Sn | +4 | 0.54 |
| Ti | +3 | 0.58 |
| Ti | +4 | 0.52 |
| V | +3 | 0.56 |
| V | +4 | 0.48 |
| V | +5 | 0.45 |
| Zn | +2 | 0.56 |

Non-limiting example of elements not included as M of the present invention include:

| Element | Valence | Radius Ratio |
|---|---|---|
| B | +1 | 0.26 |
| Ba | +1 | 1.16 |
| Ba | +2 | 1.02 |
| Ce | +3 | 0.78 |
| Cd | +1 | 0.86 |
| Cd | +2 | 0.73 |
| Cr | +1 | 0.61 |
| Cr | +2 | 0.67 |
| Cu | +1 | 0.73 |
| La | +1 | 1.05 |
| Mg | +1 | 0.62 |
| Mg | +2 | 0.50 |
| Mo | +1 | 0.70 |
| Sn | +2 | 0.70 |
| Sr | +2 | 0.85 |
| Th | +4 | 0.77 |
| Ti | +1 | 0.73 |
| Ti | +2 | 0.71 |
| Zn | +1 | 0.67 |

As synthesized, in general, the crystalline composition comprises structural aluminum, phosphorus and element M, and will exhibit an M/(aluminum plus phosphorus) atomic ratio of less than unity and greater than zero, and usually within the range of from about 0.001 to about 0.99. The phosphorus/aluminum atomic ratio of such materials may be found to vary from about 0.01 to about 100.0, as synthesized. It is well recognized that aluminum phosphates exhibit a phosphorus/aluminum atomic ratio of unity, and essentially no element M. Also, the phosphorus-substituted zeolite compositions, sometimes referred to as "aluminosilicophosphate" zeolites, have a silicon/aluminum atomic ratio of usually greater than unity, and generally from 0.66 to 8.0, and a phosphorus/aluminum atomic ratio of less than unity, and usually from 0 to 1.

The X-ray diffraction pattern of the as-synthesized crystalline composition of this invention has characteristic lines shown in Table 1.

TABLE 1

| Interplanar d-Spacing (A) | Relative Intensity (I/I$_o$) |
|---|---|
| 14.980 ± 0.1 | vs |
| 12.230 ± 0.1 | w |
| 7.493 ± 0.1 | w |
| 5.930 ± 0.1 | w |
| 4.605 ± 0.05 | w |

These X-ray diffraction data were collected with a Scintag diffraction system, equipped with a graphite diffracted beam monochromator and scintillation counter, using copper K-alpha radiation. The K-alpha 2 component of the K-alpha 1-K-alpha 2 doublet was removed with a computer stripping program. The effective X-ray wavelength for the tabulated data is therefore the K-alpha 1 value of 1.5405 Angstroms. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines, I/I$_o$, where I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75–100), s=strong (50–74), m=medium (25–49) and w=weak (0–24). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

While the improved crystalline composition of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The crystalline metalloaluminophosphate composition prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

The present composition, when employed either as an adsorbent or as a catalyst in a hyrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 300° C. to about 1100° C., preferably from about 350° C. to about 750° C., for from 1 minute to about 48 hours.

As above mentioned, synthetic metalloaluminophosphate prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IA, IIA, IIIA, IVA, IB, IIB, IIIB, IVB, VIB and VIII of the Periodic Table of Elements, especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the metalloaluminophosphate composition is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared metalloaluminophosphate with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the present metalloaluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized metalloaluminophosphate include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 hr$^{-1}$, preferably between 1 and 4 hr$^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 hr$^{-1}$, preferably between 0.5 and 4 hr$^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the metalloaluminophosphate of this invention can also be used for reducing the pour point of gas oils. This process is carried out at a liquid hourly space velocity between about 0.1 and about 5 hr$^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented.

EXAMPLE 1

A 23.1 g quantity of 86% $H_3PO_4$ is diluted with 40.74 g $H_2O$, followed by the mixing of 10.1 g alpha-alumina monohydrate (i.e. Catapal SB), and 6.0 g indium nitrate dissolved in 30.0 g $H_2O$, into the dilute phosphoric acid solution. This slurry is mixed, with stirring, at 25° C. for 10 minutes.

To the resulting homogeneous suspension is added 13.0 g of 1,7-heptanediamine as directing agent. The mixture is then transferred to a 300 ml stainless steel autoclave. The reaction mixture prepared has the following composition, in mole ratios:

$P_2O_5/Al_2O_3 = 1.0$
$H_2O/Al_2O_3 = 40$
$H^+/Al_2O_3 = 4$
$R/Al_2O_3 = 1.0$
$M/Al_2O_3 = 0.2$ with R comprising the 1,7-heptanediamine and M comprising indium.

The sealed autoclave is heated for 19 hours at 146° C., then for 4 days at 180° C. with stirring at 400 rpm.

The crystalline product composition is then separated from the final liquids by filtration, water washed, and then dried at 110° C. Samples of the dried product crystals and calcined (500° C. in air for 3 hours) crystals, analyzed by X-ray diffraction, prove to be the present metalloaluminophosphate composition comprising crystals having large pore windows.

A quantity of the as-synthesized composition of this example, analyzed for chemical composition, has the following components:

| Component | Wt. % |
|---|---|
| C | 13.44 |
| N | 4.27 |
| Al | 13.07 |
| P | 14.62 |
| M + Si | 9.99 |
| Asn | 71.42 |

A 23.1 g quantity of 86% $H_3PO_4$ is diluted with 40.74 g $H_2O$, followed by the mixing of 10.1 g alpha-alumina monohydrate (i.e. Kaiser), and 4.29 g tin sulfate dissolved in 30.0 g $H_2O$, into the dilute phosphoric acid solution (Sn being +4 valence in this solution under these conditions). This slurry is mixed, with stirring, at 25° C. for 10 minutes.

To the resulting homogeneous suspension is added 25.5 g of 1,5-pentanediamine as directing agent.

The mixture is then transferred to a 300 ml stainless steel autoclave. The reaction mixture prepared has the following composition, in mole ratios:

$P_2O_5/Al_2O_3 = 1.0$
$H_2O/Al_2O_3 = 40$
$H^+/Al_2O_3 = 4$
$R/Al_2O_3 = 1.0$
$M/Al_2O_3 = 0.2$ with R comprising the 1,5-pentanediamine and M comprising tin.

The sealed autoclave is heated to 200° C. and stirred (800 rpm) at this temerature and autogenous pressure for 3 days.

The crystalline product composition, separated from the final liquids by filtration, water washing, and drying at 110° C., produces an X-ray diffraction pattern proving it to be the present metalloaluminophosphate composition comprising crystals having large pore windows.

A quantity of the composition of this example, calcined at 300° C. in air for 3 hours, is also analyzed by X-ray diffraction. The results of this analysis prove the product hereof to be structurally stable to thermal treatment.

What is claimed is:

1. A crystalline metalloaluminophosphate composition comprising crystals which, as synthesized, exhibit a characteristic X-ray diffraction pattern with interplanar d-spacings at 14.980±0.1, 12.230+0.1, 7.493±0.1, 5.930±0.1 and 4.605±0.05 Angstroms and have a composition in terms of mole ratios, as follows:

$$A_v \!:\! Q^{q+} {}_{|i/q|} \!:\! (AlO_2{}^-)_{1-x} \!:\! (PO_2{}^+)_{1-y} \!:\! (MO_2{}^{m-4})_{x+y} \!:\! T^{t-}{}_{|j/t|}$$

wherein A represents occluded organic material, v is the number of moles of A, Q represents cations of valence q, T represents anions of valence t, M is one or more elements of valence m, other than aluminum or phosphorus, and combinations thereof with $Si^{+4}$ wherein less than about 50% of M is $Si^{+4}$, and x,y,i and j are numbers which satisfy the relationship i−j=y−x+(4+m)·(x+y) and wherein m is from +2 to +6 with M having a Radius Ratio of from 0.15 to 0.73, said Radius Ratio being from 0.52 to 0.62 when m is +2.

2. The crystals of claim 1 which have a composition, in terms of mole ratios, as follows:

$$Q^{q+}{}_{|i/q|} \!:\! (AlO_2{}^-)_{1-x} \!:\! (PO_2{}^+)_{1-y} \!:\! (MO_2{}^{m-4})_{x+y} \!:\! T^{t-}{}_{|j/t|}.$$

3. A catalyst composition comprising the crystalline metalloaluminophosphate composition of claim 1.

4. A catalyst composition comprising the crystalline metalloaluminophosphate composition of claim 2.

5. The composition of claim 1 wherein M comprises $In^{+3}$, $Sb^{+3}$, $Sn^{+4}$, $Ti^{+3}$ or $Ti^{+4}$.

6. A method for synthesizing a crystalline metalloaluminophosphate composition comprising crystals which, as synthesized, exhibit a characteristic X-ray diffraction pattern with interplanar d-spacings at 14.980±0.1, 12.230±0.1, 7.493±0.1, 5.930±0.1 and 4.605±0.05 Angstroms, which comprises (i) preparing a mixture capable of forming said metalloaluminophosphate, said mixture comprising sources of aluminum, phosphorus, non-aluminum and non-phosphorus element M characterized by an oxidation number of +2 to +6 and a Radius Ratio of from 0.15 to 0.73, said Radius Ratio being from 0.52 to 0.62 where the oxidation number is +2, water and a directing agent (R), and having a composition, in terms of mole ratios, within the following ranges:

$P_2O_5/Al_2O_3$: 0.01 to 20
$H_2O/Al_2O_3$: 2 to 400

$H^+/Al_2O_3$: 0.01 to 30
$R/Al_2O_3$: 0.01 to 20
$M/Al_2O_3$: 0.01 to 20 wherein R is a $C_5$–$C_7$ alkyldiamine, (ii) maintaining said mixture under sufficient conditions until crystals of said metalloaluminophosphate are formed and (iii) recovering said crystalline metalloaluminophosphate from step (ii).

7. The method of claim 6 wherein said mixture has the following composition ranges:

$P_2O_5/Al_2O_3$: 0.2 to 5
$H_2O/Al_2O_3$: 5 to 200
$H^+/Al_2O_3$: 0.5 to 20
$R/Al_2O_3$: 0.1 to 10
$M/Al_2O_3$: 0.1 to 10.

8. The method of claim 6 wherein said directing agent R is heptanediamine.

9. The method of claim 6 wherein said directing agent R is pentanediamine.

10. The method of claim 6 wherein said mixture further comprises seed crystals in sufficient amount to enhance synthesis of said crystalline metalloaluminophosphate.

11. The method of claim 6 comprising replacing cations of the crystalline metalloaluminophosphate recovered in step (iii), at least in part, by ion exchange with a cation or a mixture of cations selected from the group consisting of hydrogen and hydrogen precursors, rare earth metals, and metals from Groups IA, IIA, IIIA, IVA, IB, IIB, IIIB, IVB, VIB and VIII of the Periodic Table of Elements.

12. The method of claim 11 wherein said replacing cation is hydrogen or a hydrogen precursor.

13. The recovered crystalline metalloaluminophosphate of claim 6.

14. A process for effecting catalytic conversion of an organic compound-containing feedstock which comprises contacting said feedstock under catalytic conversion conditions with the catalyst composition of claim 3.

15. A process for effecting catalytic conversion of an organic compound-containing feedstock which comprises contacting said feedstock under catalytic conversion conditions with the catalyst composition of claim 4.

* * * * *